UNITED STATES PATENT OFFICE.

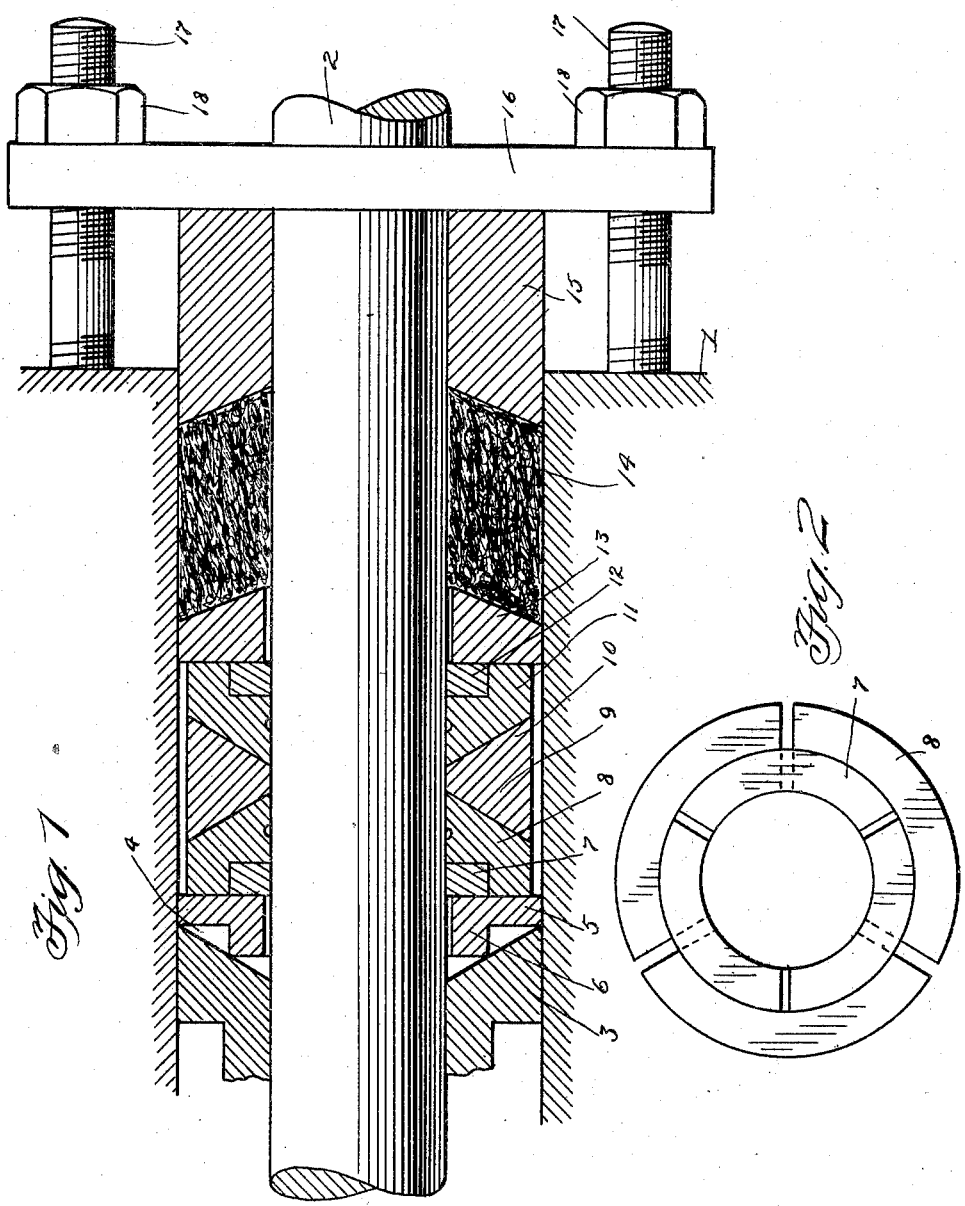

HAKON WILFRED RAMBERG, OF BROOKLYN, NEW YORK.

PACKING.

967,235.  Specification of Letters Patent.  Patented Aug. 16, 1910.

Application filed February 28, 1910. Serial No. 546,471.

*To all whom it may concern:*

Be it known that I, HAKON W. RAMBERG, citizen of the United States, residing at Brooklyn, in the county of Kings and State of New York, have invented certain new and useful Improvements in Packings, of which the following is a specification.

This invention relates to improvements in packings and the leading object in view is the construction of a packing having divided packing rings and means whereby the rings may be forced closely against a piston rod.

One of the objects of the invention in addition to the above is the construction of a packing wherein two divided packing rings are used and two undivided rings are used, which can exert a wedging action on the divided rings when pressure is applied thereto by means of screws.

With the above and other objects in view the invention comprises certain combinations, constructions and arrangements of parts, clearly described in the following specification and clearly illustrated in the accompanying drawings, in which, Figure 1 is a sectional view of the improved packing, and Fig. 2 is a detail end view of two packing rings.

Referring to the accompanying drawings illustrating the invention 1 denotes a gland through which a piston rod 2 works. On the inner side of the gland an annular member 3 is fixed, which member is formed with a concave outer surface 4. The member 3 is engaged by a solid ring 5, which is provided with a shoulder 6 engaging said member 3, whereby said ring is prevented from spreading. The ring 5 has a clearance from the piston rod 2 and fits tightly in said gland
1. A packing ring 7, divided into three parts engages the piston rod and the ring 5. This ring 7 fits in a socket formed in the ring 8, which is formed in three sections, and with a convex outer surface 9. The ring 8 is engaged by a solid ring 10, which is formed with concave ends. Against the outer side of the ring 10 a packing ring 11 formed in three sections is disposed. This ring is formed like the ring 8, being pro-
vided with a convex inner end and with a socket, in which the three section ring 12 is located. The three rings, 8, 10 and 11 have a clearance with the wall of the gland 1. Against the rings 11 and 12 a solid ring 13 is located, this ring being provided with a flat end and a convex outer end. The ring 13 has a small clearance with the piston rod 2 and is engaged by packing material 14. The packing material 14 is engaged by a presser head 15, which is formed with a concave inner end and is connected or engaged by a bar 16, through which bar screws 17 extend into the gland 1. The bar 16 is held against movement on the screws by means of nuts 18. The sections of the rings 7 and 12 overlap the sections of the rings 8 and 11, thus forming a good steam tight connection.

By screwing the nuts against the bar 16 the head 15 will be forced against the packing material 14 and the solid rings 12 and 10 will be forced against the divided or split rings so that said sections of said divided or split rings will close up around the piston 2. By this means the wear of the packing rings, which may be Babbitt metal or brass or other material can be readily taken up without replacing the packing rings, until, of course they are wholly useless.

Having described my invention I claim:—

1. A packing comprising divided packing rings having sockets, divided rings in the sockets, a solid ring between the divided packing rings first named, a part of said rings having convex surfaces and a part having concave surfaces, one of said rings having a pocket therein, a ring fitted in said pocket, and means for forcing the divided rings against the solid ring whereby said divided rings will be forced against the piston rod.

2. A packing comprising a gland, a piston rod therein, a member having a concave surface, a solid ring having a shoulder engaging said surface, a packing ring having a socket and formed in sections, a divided ring in the socket, said socketed ring being formed with a convex outer surface, a solid ring having concave surfaces engaging said convex surface, a divided ring having a concave surface engaging with the solid ring and a pocket on its outer end, a divided ring in the pocket, a solid ring against the divided rings last named, packing material against the last solid ring, a presser head against the packing material, a bar against the presser head, and means for forcing the bar toward the gland.

In testimony whereof I affix my signature, in presence of two witnesses.

HAKON WILFRED RAMBERG.

Witnesses:
T. VAN HAUEN,
H. E. KROSENZ.